(12) United States Patent
Schecter

(10) Patent No.: US 7,546,988 B1
(45) Date of Patent: Jun. 16, 2009

(54) MULTI SIZE WIRE, CABLE AND CONDUIT FASTENER—CLAMP

(76) Inventor: Robert Schecter, P.O. Box 2, Fall River, MA (US) 02722

(*) Notice: Subject to any disclaimer, the term of this patent is extended or adjusted under 35 U.S.C. 154(b) by 64 days.

(21) Appl. No.: 11/804,662

(22) Filed: May 18, 2007

Related U.S. Application Data

(60) Provisional application No. 60/809,176, filed on May 30, 2006.

(51) Int. Cl.
*F16L 3/00* (2006.01)
(52) U.S. Cl. ............... 248/73; 248/65; 248/74.4; 248/909; 411/475
(58) Field of Classification Search ............ 248/73, 248/74.4, 74.5, 65, 909; 411/475, 476, 535, 411/546
See application file for complete search history.

(56) References Cited

U.S. PATENT DOCUMENTS

| | | | |
|---|---|---|---|
| 3,244,797 A * | 4/1966 | Watson ............... 174/84 S |
| 4,588,152 A * | 5/1986 | Ruehl et al. ............. 248/71 |
| 5,054,741 A * | 10/1991 | Ismert ................ 248/74.5 |
| 5,411,228 A * | 5/1995 | Morawa et al. .......... 248/74.5 |
| 6,073,891 A * | 6/2000 | Humber ............... 248/74.5 |
| 6,378,813 B1 * | 4/2002 | Gretz ................. 248/68.1 |
| 6,708,461 B1 * | 3/2004 | Wise .................... 52/700 |
| 7,118,318 B2 * | 10/2006 | Ryals et al. ............. 411/475 |
| 2006/0198718 A1 * | 9/2006 | Chen ................... 411/475 |
| 2007/0158506 A1 * | 7/2007 | Trotter et al. ............. 248/65 |

* cited by examiner

*Primary Examiner*—Ramon O Ramirez
(74) *Attorney, Agent, or Firm*—Robert J Doherty

(57) ABSTRACT

A fastening device for attaching wire, cable, pipe and conduit to structural members of a building having separated legs and a connecting portion which connecting portion has means for progressively enlarging the size thereof to accommodate varying sizes of such wire, pipe, etc. so as to reduce the number of specifically sized devices to accomplish the connecting task.

12 Claims, 13 Drawing Sheets

MULTI SIZE WIRE, CABLE AND CONDUIT FASTENER—CLAMP

This application claims the benefit of U.S. provisional Patent Application Ser. No. 60/809,176 filed May 30, 2006.

BACKGROUND OF THE INVENTION

This invention relates to a device that is adapted to fasten various electrical and plumbing service components such as wire, cable, conduit and pipe to the framing structure of a house, building or other structure during the construction thereof. Such devices are known and include staples, clips, clamps, etc. having a U-shaped body to cradle the service component at spaced intervals and with opposed points or legs by which the attachment device is nailed or otherwise secured to the framing structures, e.g., joists, studs, etc.

Such devices include staple-like fasteners generally made from metal as well as the more recently adopted clamps having a U-shaped plastic body with opposed legs through which nails are driven to accomplish the attachment tasks above described.

SUMMARY OF THE INVENTION

The above described prior art devices are adequate for the fastening tasks for which they are used intended. However, the many different plumbing and electrical service components necessary during building construction come in a fairly wide variety of sizes, e.g., 16-gauge electrical wire is much smaller in circumference than 8-gauge electrical cable, and the outside diameter of plastic PVC hot water conduit is of a sized differently than copper pipe which itself comes in various sizes, e.g., ½", ¾" or 1" inside diameter. These size differences in the electrical and plumbing service components thus necessitate that electrical and plumbing contractors have variously sized attaching devices available at the job site for each construction project. Even if the service contractor selects one particular fastening device style, the requirement for different sizes thereof necessitates that three, four or even more boxes of the fastening devices be carried to the work site or stocked in the contractor's vehicle. This invariably leads to situations in which the electrician or other skilled artisan requires a ½" size clamp and only has a ¾" clamp in his truck or at the work site and thus has to send someone out to obtain the properly sized clamp. In addition to storage space considerations often a problem at work sites or in contractors' trucks, time and work effort are expended to oversee available inventory stock to ensure that an adequate supply of the correctly sized fastening devices are readily available in the trucks or at the job site. The above-indicated problems are even more pronounced when the nature of the work is a service call and the tradesman responding thereto does not know what various size service components are in place in the building. Service calls also are usually handled by smaller trucks where space limitations are even a greater consideration.

It would thus be useful to have clamp fastener devices which can accommodate, that is, properly secure variously sized service components yet still provide the snug fit of the component with respect to the device that is required for the task. The provision of such a device that in its initially provided form would accommodate the smallest sized service component could then be altered to progressively accommodate larger sized service components, e.g., a device to secure # 16 wire can be progressively altered to enlarge the device to accommodate # 12 and then # 8 wire/cable. Such a device would solve the inventory and space problems of prior art devices.

This and other objects of the present are accomplished by a service component fastening device having a body having a pocket adapted to receive the service component which body includes a pair of laterally opposed legs having, in turn, means for accepting a fastening device such as a nail therethrough and portions of said body being removable to enlarge the receiving pocket to accommodate progressively larger service components therein.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DETAILED DESCRIPTION OF THE INVENTION

Figure 1:
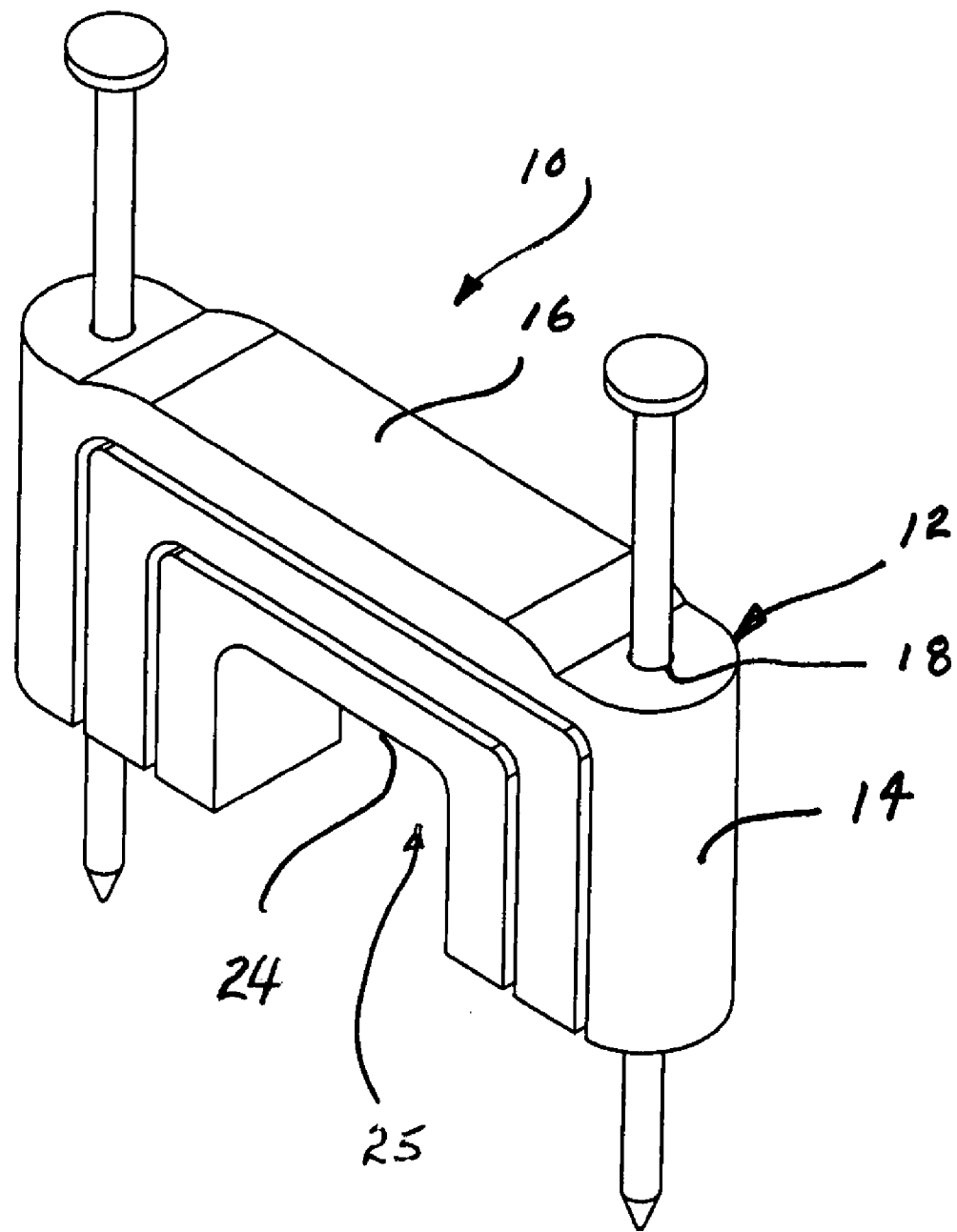
FIG. 1 is a perspective view of a device illustrating one form of the invention configured in particular for receipt of electrical wire and cable.
Figure 2:
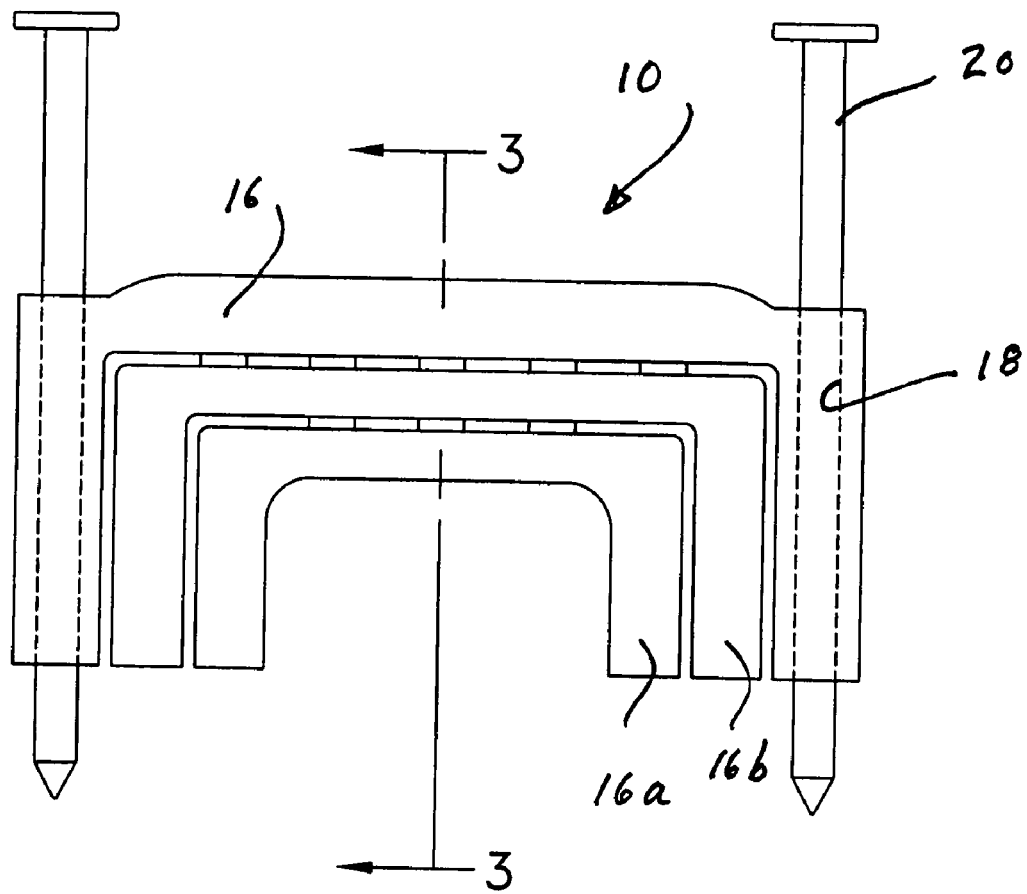
FIG. 2 is a front elevational view of FIG. 1.
Figures 3, 4:
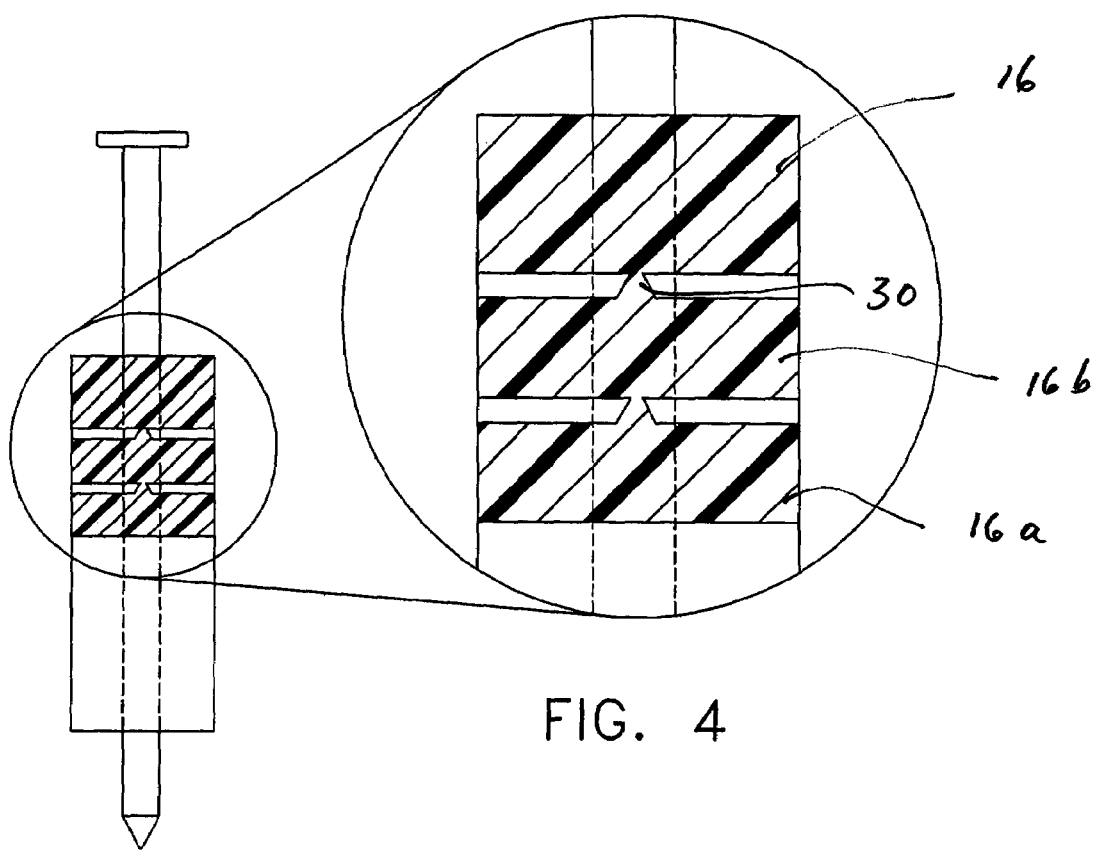
FIG. 3 is a sectional view along the line 3-3 of FIG. 1.
FIG. 4 is an enlarged view of FIG. 3.
Figure 5:
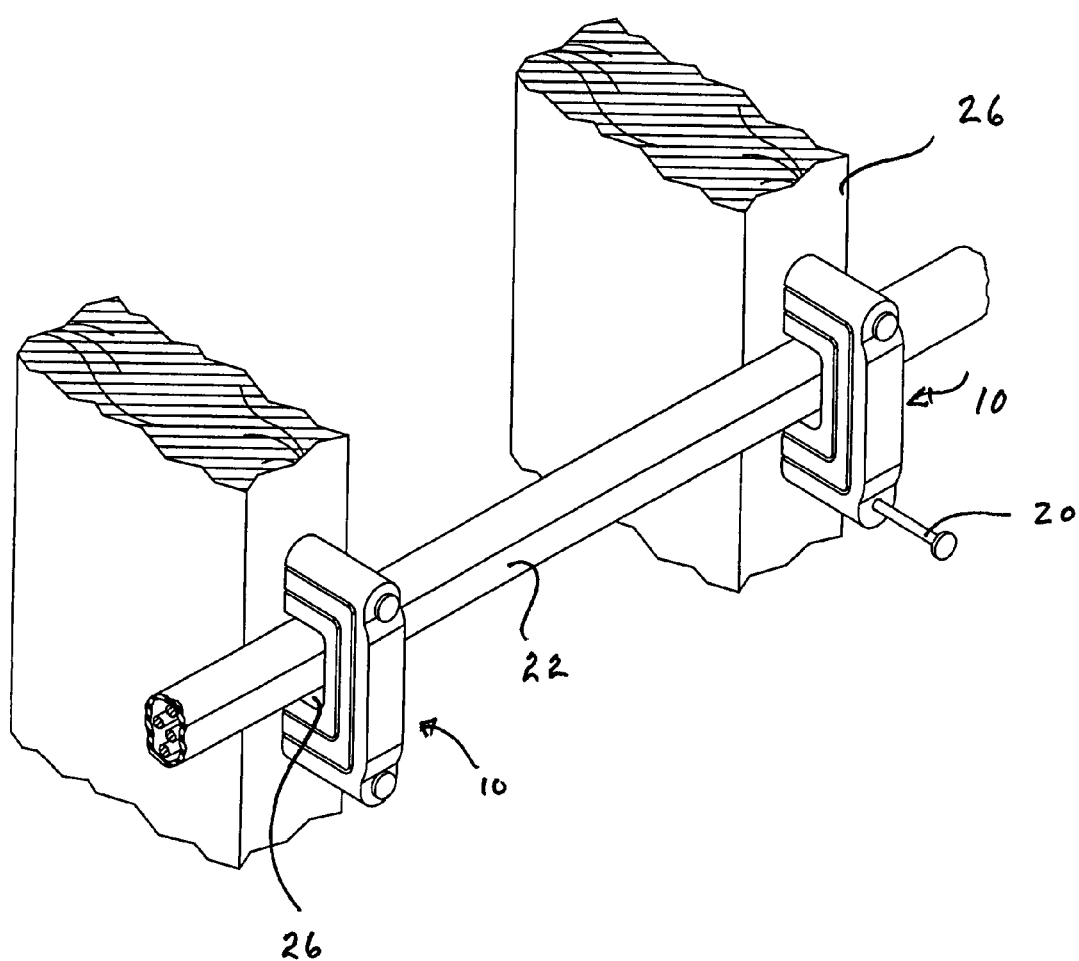
FIG. 5 is a perspective view of a structural installation utilizing the devices shown in FIG. 1.
Figure 6:
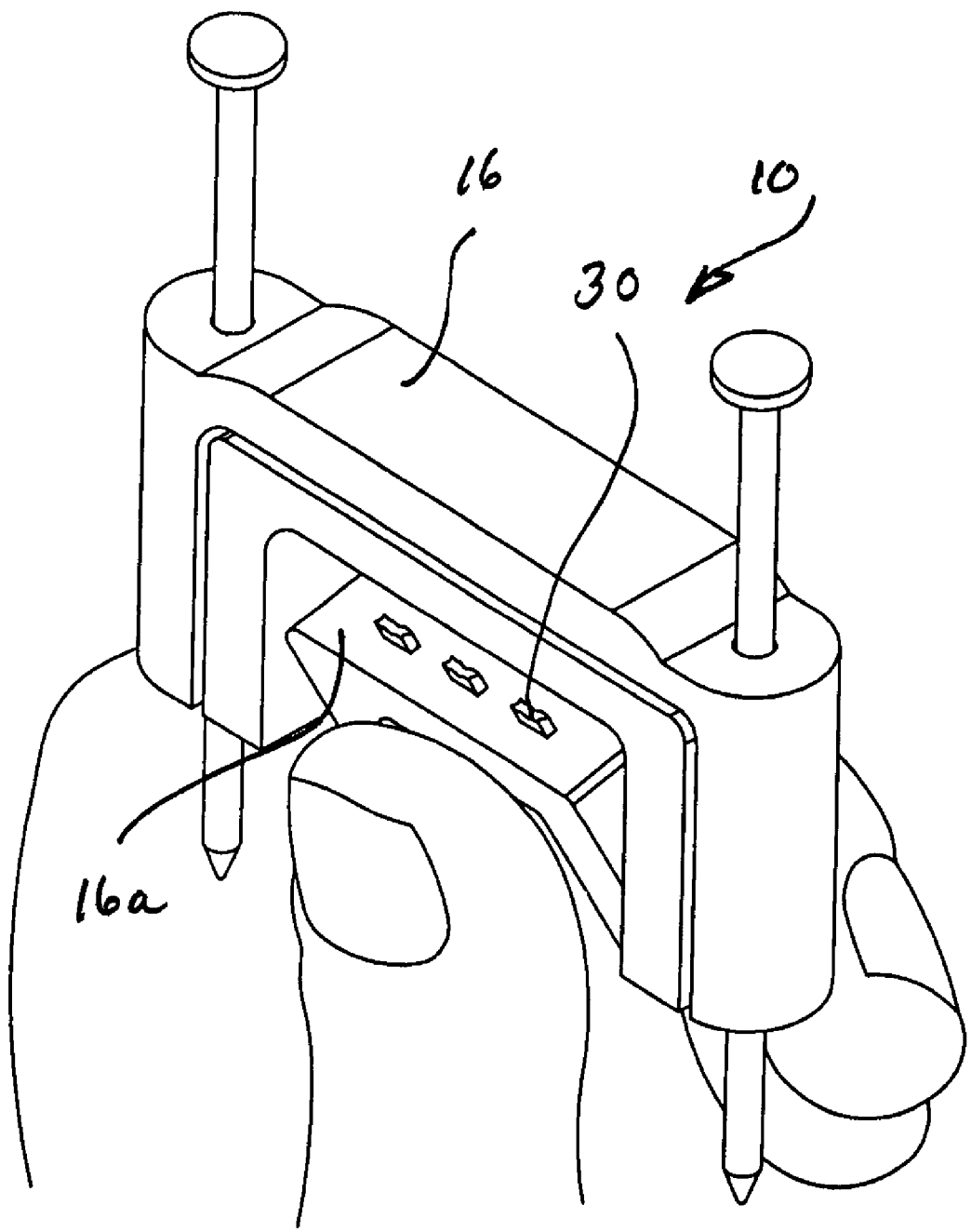
FIG. 6 is a perspective view similar to FIG. 1 but showing one manner in which the body of the device shown therein may be enlarged to accept larger wire and cable.
Figure 7:
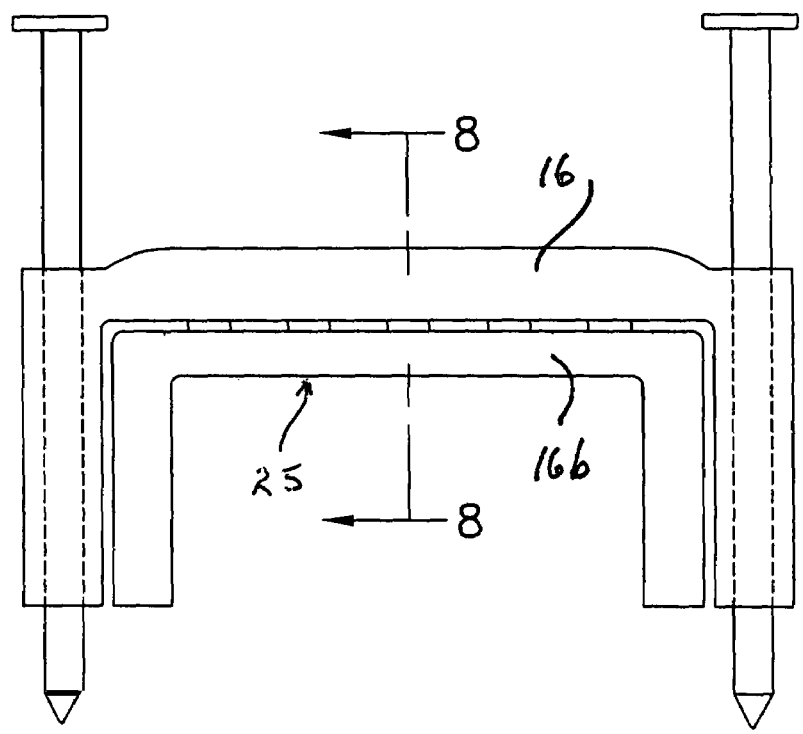
FIG. 7 is a front elevational view of the device of FIG. 6 after such device is enlarged.
Figure 8:
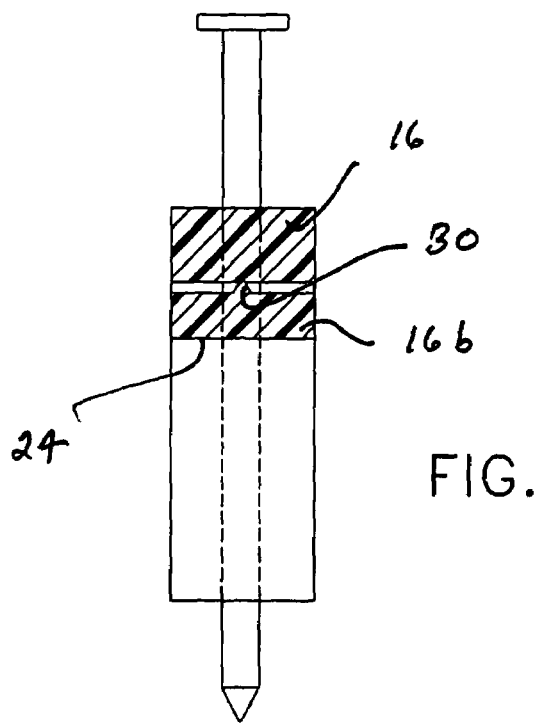
FIG. 8 is a sectional view along the line 8-8 of FIG. 7.
Figure 9:
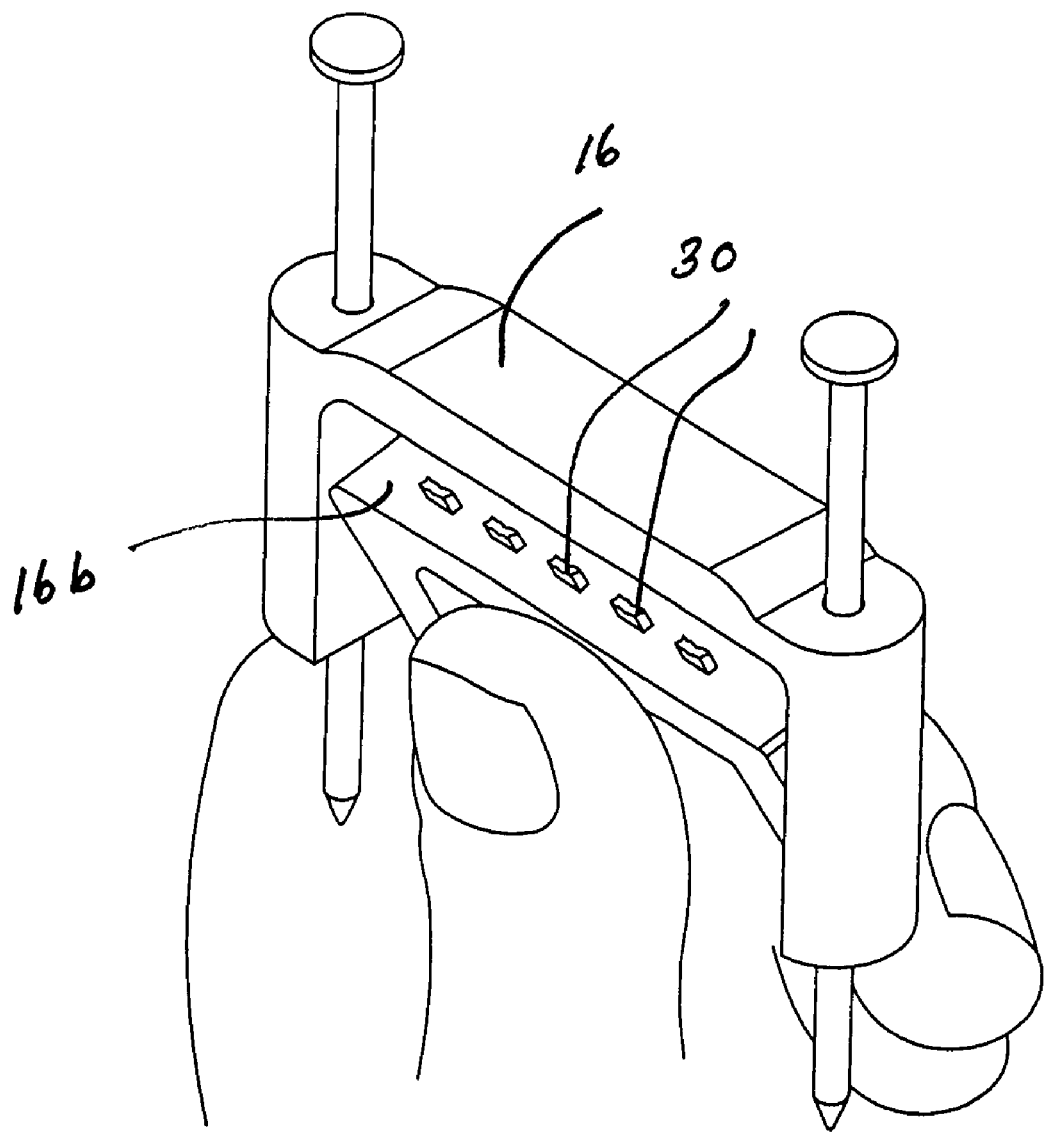
FIG. 9 is a perspective view similar to FIGS. 1 and 6 showing one manner in which the body of the device shown therein may be further enlarged to accept even larger wire and cable.
Figure 10:
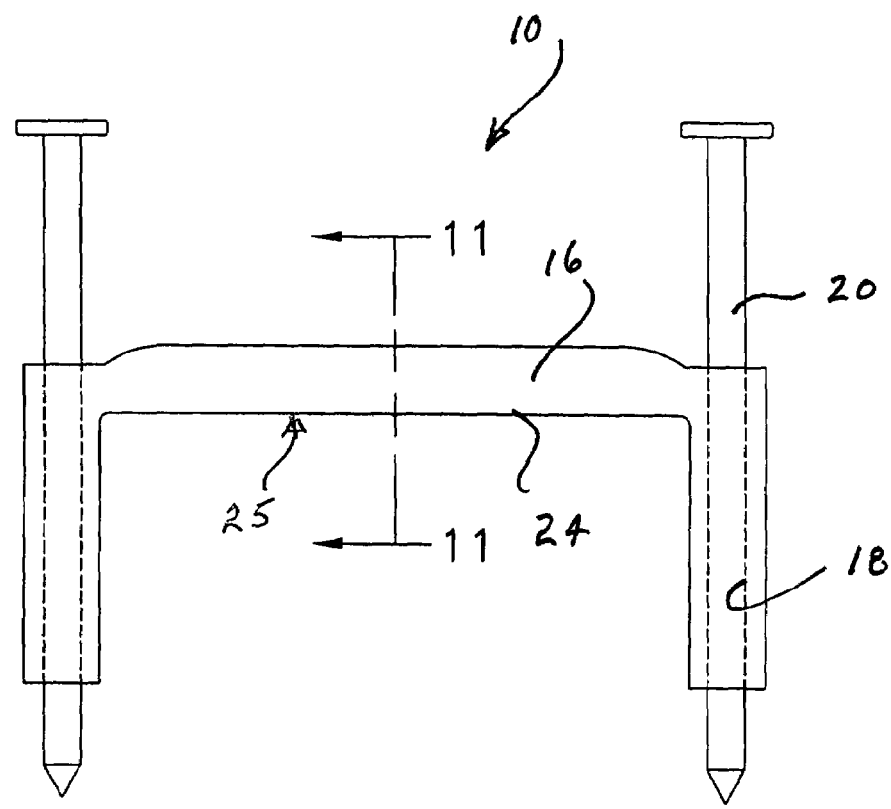
FIG. 10 is a front elevational view of the device of FIG. 9 after such device has been enlarged.
Figure 11:
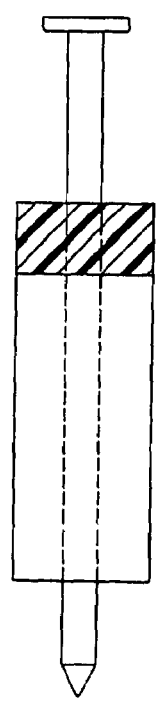
FIG. 11 is a sectional view along the line 11-11 of FIG. 10.

Turning now to the drawings and particularly FIGS. 1-11, a preferred form of the invention is shown for particular use with electrical wire and cable. The device 10 illustrated therein includes a body 12 having a pair of laterally separated legs 14 joined by a top central portion or connecting member 16. Generally, the device 10 is constructed from a tough resilient plastic material that is preferably an electric insulator such as butadiene-modified polyethylene. The device can be formed by standard injection molding techniques. The material and manufacturing method is not, however, limited to the above example, and the device can be formed of any suitable material by any suitable procedure.

Each leg 14 is provided with a bore 18 for receipt of a fastener such as nails 20. As will be apparent particularly from FIG. 5, the device 10 is placed over a wire or cable 22 such that the lower surface 24 of the top member forms a receiving pocket 25 so as to contact and/or cradle the wire when disposed against a structural member such as a stud or joist 26. The nails penetrate into the stud/joist 26 by conventional hammering which takes place above the legs 14 rather than via contact with central portions of the member 16 for reasons which will be apparent hereinafter. After a series of devices have been attached as above described, the wire/cable is firmly attached to the structural members as desired.

Referring again to FIGS. 2-4 and 6, the body 12 includes a connecting member 16 which itself includes one or more additional sub members, e.g., 16a and 16b, nested within the interior of member 16 and attached thereto and to each other (in those cases where there are two or more sub members) by connecting webs 30 (best shown in FIG. 6). When a larger wire or cable is to be fastened, the innermost sub member 16a can be snapped away from the middle or intermediate sub member 16b positioned immediately above sub member 16a. The sub member 16b, in turn, is similarly connected to the underside of member 16 by means of the same breakaway webs. The webs are pictured as separated laterally from each other but may alternatively be a single narrowed material web at the top of each sub member and both the separated webs and the connective narrowed web each may extend along the sub legs 14a and 14b of the respective sub members. Removal of one or both of the sub members is preferably by hand grasping and twisting, however, such action can be facilitated by using pliers or other grasping tools.

The removal of one or more of the sub members is determined by the wire or cable size to be fastened. Additionally, both sub members can be removed simultaneously, if desired, especially when the tradesman has already determined the proper size dimensions for the device to accommodate the wire/cable. The procedure of nailing through the legs 14 via bores 18 remains the same regardless of the opening size beneath the connecting member 16 as determined by how many or if no sub members are removed. Since the force of the hammer is laterally removed from the connecting member, such force is unlikely to dislodge a sub member unintentionally.

Figure 12:
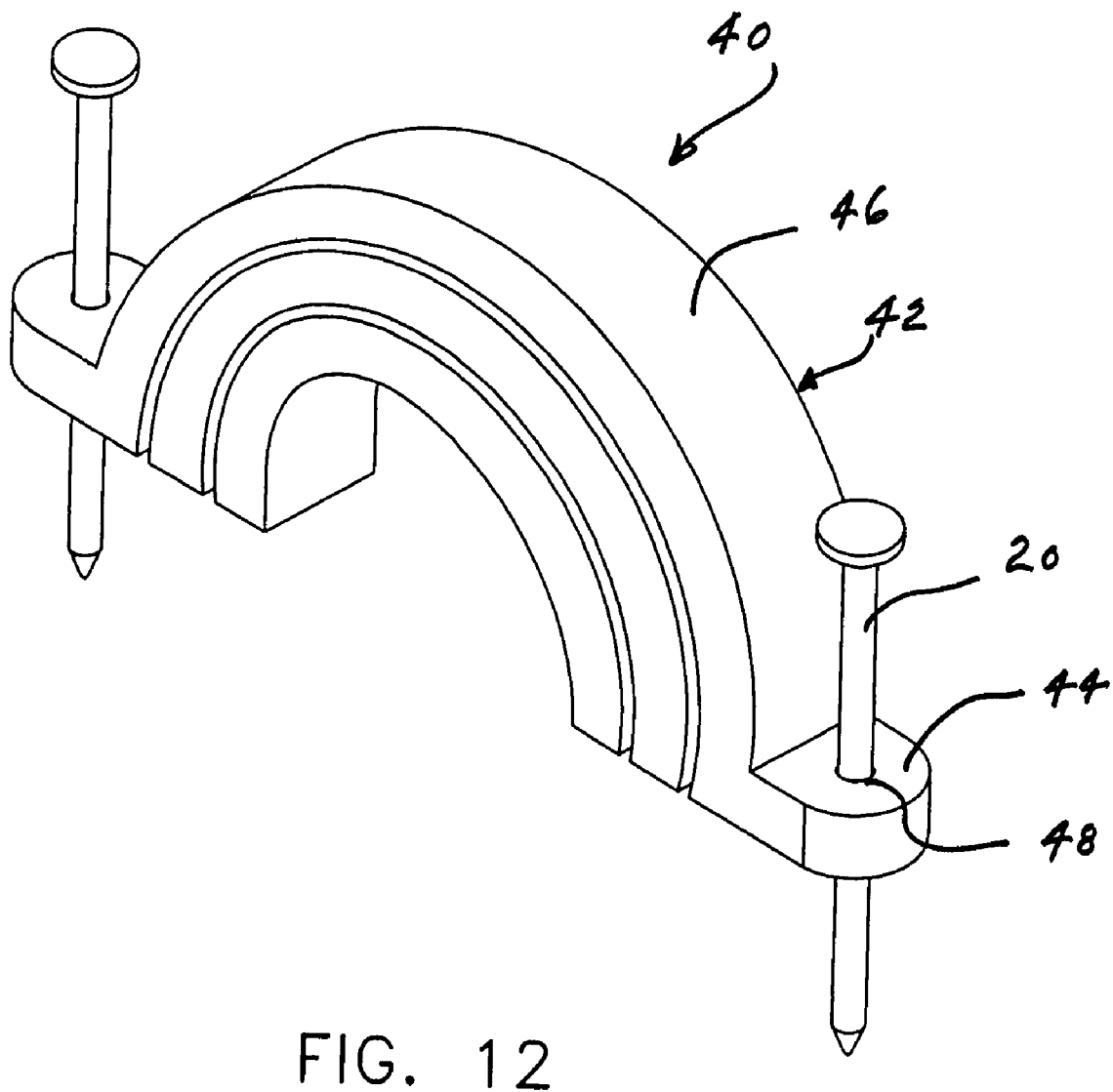
FIG. 12 is a perspective view of a device of the present invention illustrating a further embodiment configured to receive heating conduit and pipe.
Figure 13:
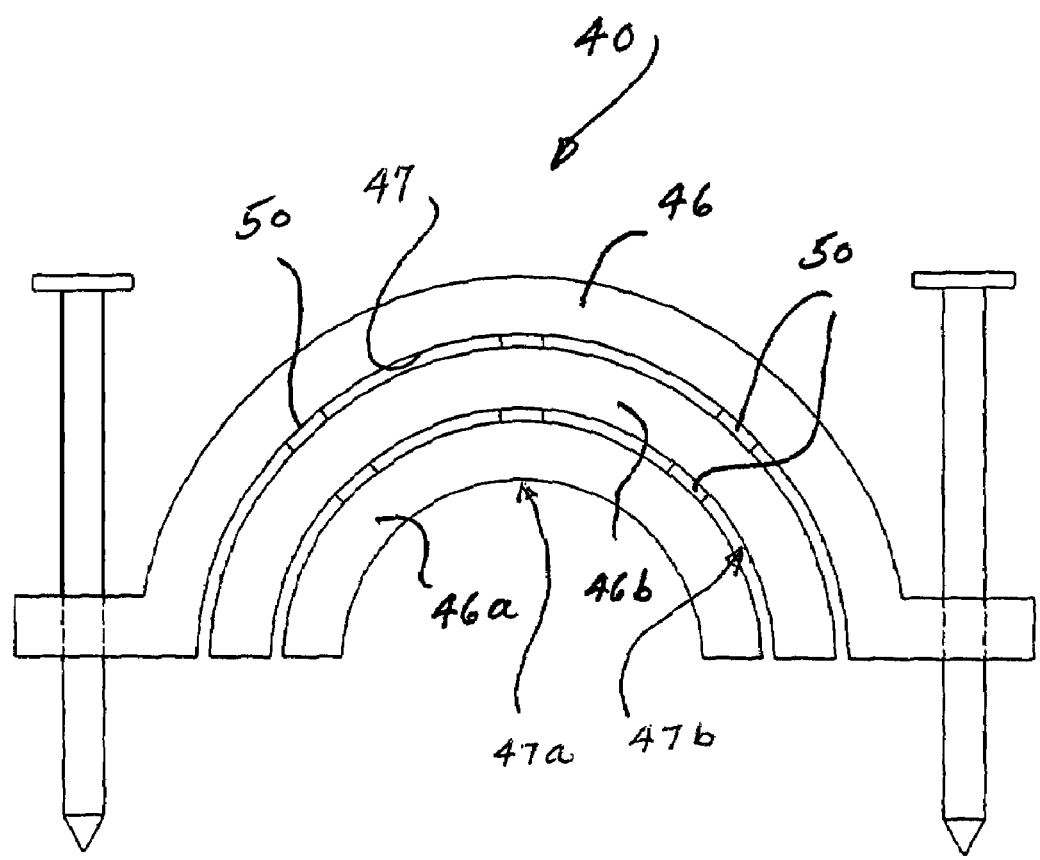
FIG. 13 is a front elevational view of FIG. 12.
Figure 14:
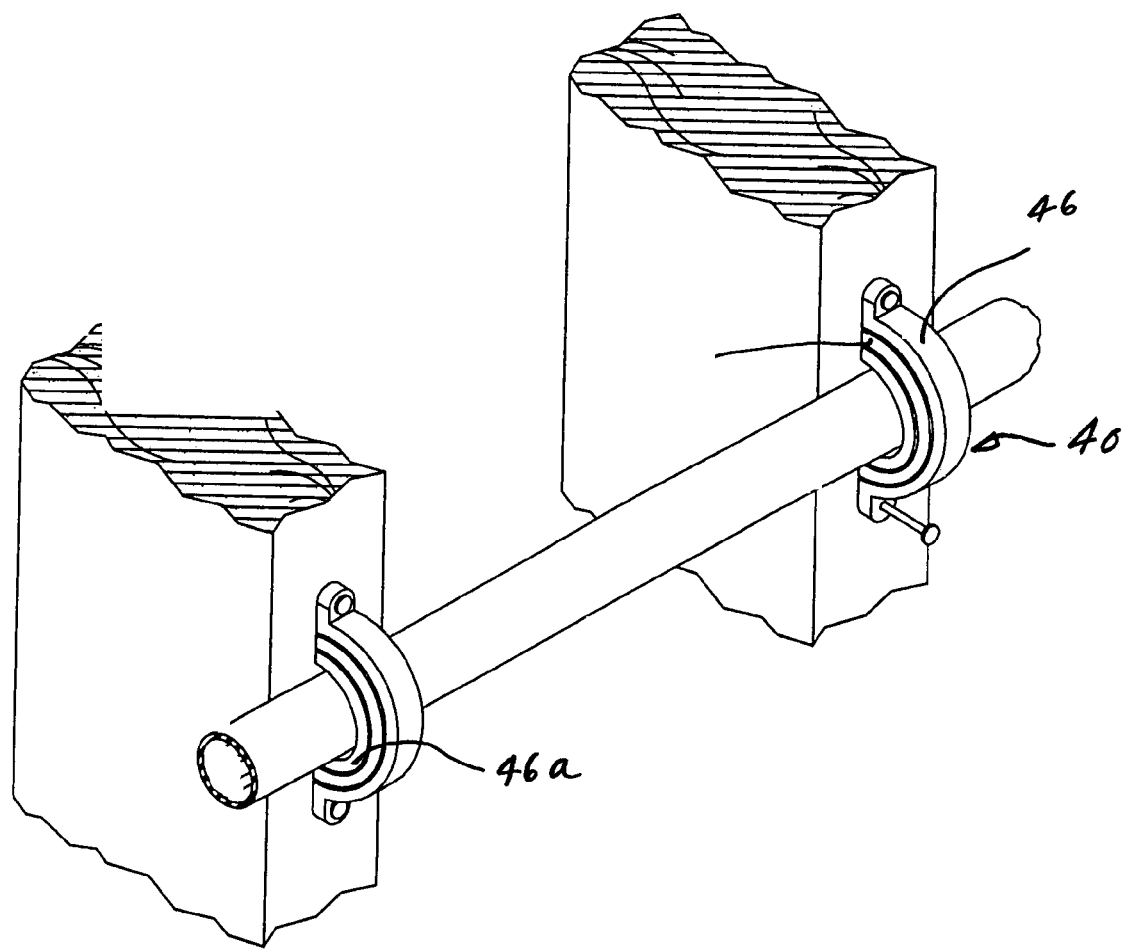
FIG. 14 is a perspective view of a structural installation utilizing the device shown in FIG. 12.
Figure 15:
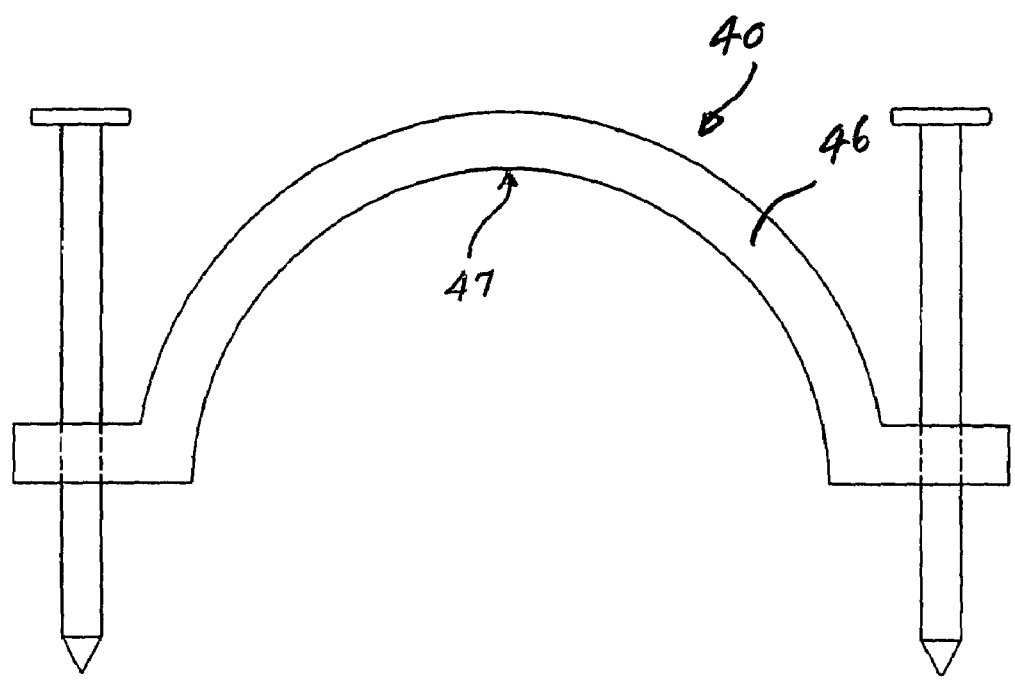
FIG. 15 is a front elevational view of the device shown in FIG. 12 after the body of the device has been enlarged to the fullest extent to accept relatively large conduit and pipe.
Figure 16:
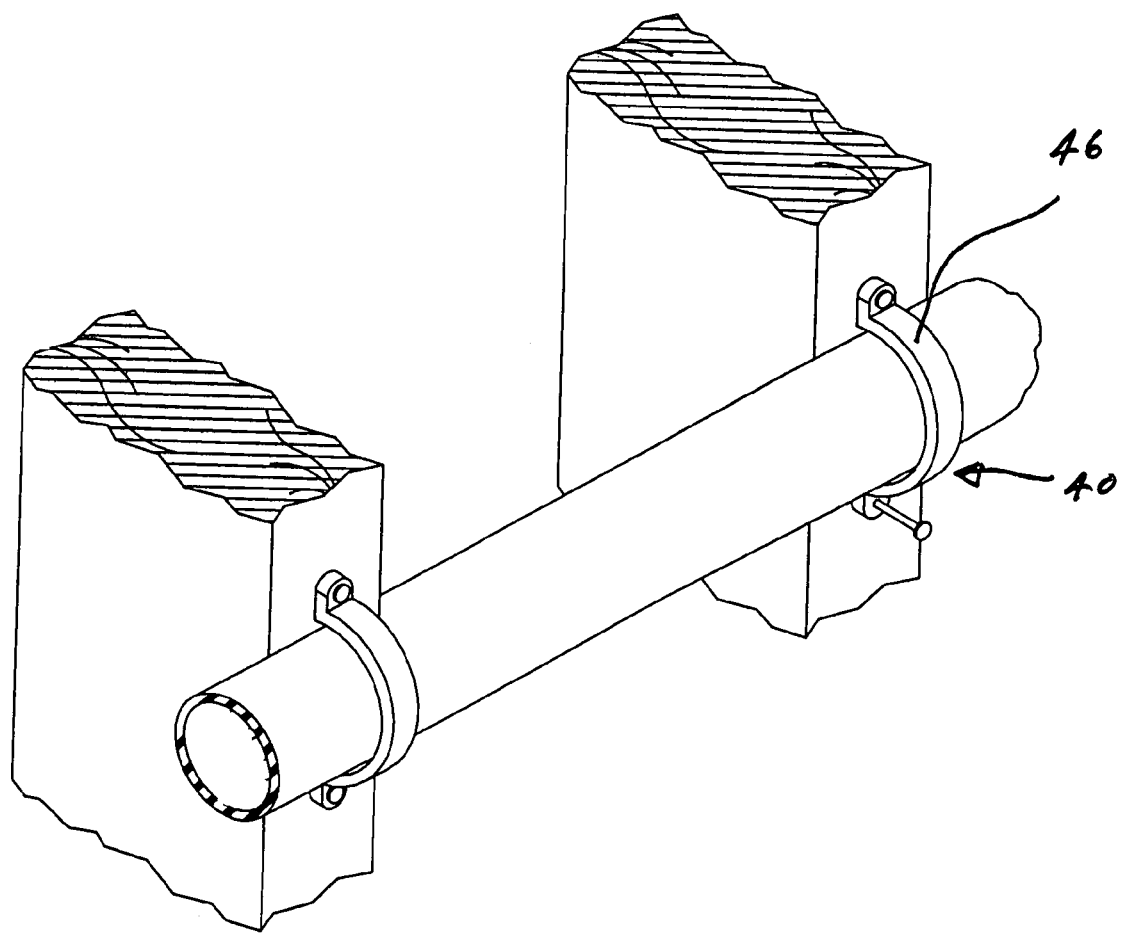
FIG. 16 is a perspective view similar to FIG. 14 but utilizing the fully enlarged device of FIG. 15.

The present invention also has utility with the securing of pipe and conduit to structural elements of a house or other building. Such plumbing type pipe and conduit includes water pipe such as copper pipe in varying sizes, e.g., ½', ¾" and 1" diameters, as well as heating pipe that includes both copper and engineered plastic. Further applicability is for thin-walled metal conduit in which electrical wires are housed—the common thread being that such pipe, conduit, etc. exhibits a general circular cross-section. Accordingly, the device 40 shown in FIGS. 12-16 is configured to particularly accept pipe, etc. of circular cross-sectional configurations, as opposed to the somewhat flat configurations shown in the FIGS. 1-11 embodiments.

Turning now to FIGS. 12-16, the device 40 includes essentially all the structural features of the device 10 including a body 42 and a pair of legs or flanges 44 which are formed as the lateral extensions of the rounded generally semi-circular connecting member 46. The legs include bores 48 through which nails 20 extend to attach the device 40 to the structural members of the house/building. In addition to connecting member 46, the body 42 includes one or more sub members 46a, 46b that are connected to each other and to the connecting member 46 via connecting webs 50 which, as in the previous embodiment, serve to enable the sub members to be broken away from each other and/or the member 46 as necessitated by the conduit or pipe diameter. The inner surface portions 46, 46a and 47b of the members form receiving pockets 47, 47a and 47b for the variously sized conduits or pipes.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for attaching building service components of varying sizes such as wire, cable and pipe to framing portions of a building comprising a body having a central member defining a receiving pocket adapted to receive a first service component therein, which body further includes opposed leg portions having means for accepting a fastening device therethrough so as to enable the device to be attached to the framing portions, portions of said central body portion being removable to enlarge said receiving pocket to accommodate progressively larger service components therein, said body including a central portion and outer body segments, said leg portions integral with said outer body segments and disposed on opposite sides of said central portion, said central body portion member including an inner sub member body portion removably connected to said central portion, said inner body portion defining an inner receiving pocket for receiving a smaller sized service component than said first service component, connecting means for removably connecting said sub member to said central body member, said connecting means being a plurality of integral connecting webs disposed therebetween.

2. The attaching device of claim 1, said central portion including an intermediate sub member disposed between said inner sub member and said central body portion member, said inner sub member removably connected to said intermediate sub member which intermediate sub member is removably connected to said central body portion member.

3. The attaching device of claim 1, said central body portion member and said inner sub member including laterally opposed legs and sub legs respectively which define generally U-shaped receiving pockets of larger and smaller extent respectively, said inner sub member nested inside said larger extent receiving pocket.

4. The attaching device of claim 1, said central body portion member and said sub members defining generally semi-circular receiving pockets in nested relationship to each other.

5. The attaching device of claim 1, said central body portion member and said sub member each having a generally semi-circular body portion and wherein the central body portion includes a pair of outwardly extending flanges adapted in turn to receive fastening means.

6. A device for attaching building service components of varying sizes such as wire, cable and pipe to framing portions of a building comprising a central body portion having a central member defining a receiving pocket adapted to receive a first service component therein, which body further includes opposed leg portions having means for accepting a fastening device therethrough so as to enable the device to be attached to the framing portions, portions of said central body portion being removable to enlarge said receiving pocket to accommodate progressively larger service components therein, said central body portion member including an inner sub member body portion integral with and removably connected to said central portion, said inner sub member body portion defining an inner receiving pocket for receiving a smaller sized service component than said first service component and connecting means for removably connecting said sub member to said central body member, said connecting means comprising narrowed connective web material integral with and positioned between said sub member and said central body member.

7. The attaching device of claim 6, said body including a central portion and outer body segments, said leg portions integral with said outer body segments and disposed on opposite sides of said central portion.

8. The attaching device of claim 6, said central portion including an intermediate sub member disposed between said inner sub member and said central body portion member, said inner sub member integral with and removably connected to said intermediate sub member which intermediate sub member is removably connected to said central body portion member.

9. The attaching device of claim 8, said central body portion member and said sub members defining generally semi-circular receiving pockets in nested relationship to each other.

10. The attaching device of claim 6, said central body portion member and said inner sub member including laterally opposed legs and sub legs respectively which define generally U-shaped receiving pockets of larger and smaller extent respectively, said inner sub member nested inside said larger extent receiving pocket.

11. The attaching device of claim 6, said central body portion member and said sub member each having a generally semi-circular body portion and wherein the central body portion includes a pair of outwardly extending flanges adapted in turn to receive fastening means.

12. The attaching device of claim 6, said connecting means being a plurality of integral separate connecting webs disposed between said sub member and said central body member.

\* \* \* \* \*